US005780572A

United States Patent [19]

Graham

[11] Patent Number: 5,780,572

[45] Date of Patent: Jul. 14, 1998

[54] METHOD OF INCREASING POLYANILINE CONDUCTIVITY

[75] Inventor: Charles R. Graham, St. Peters, Mo.

[73] Assignee: Monsanto Company, St. Louis, Mo.

[21] Appl. No.: 686,518

[22] Filed: Jul. 26, 1996

[51] Int. Cl.[6] .................................................... C08G 65/38

[52] U.S. Cl. .......................... 528/210; 528/211; 528/215; 528/422; 252/500; 252/510; 252/511

[58] Field of Search .................................... 528/210, 211, 528/215, 422; 252/500, 510, 511

[56] References Cited

U.S. PATENT DOCUMENTS

| | | |
|---|---|---|
| 5,232,631 | 8/1993 | Cao et al. . |
| 5,281,363 | 1/1994 | Schacklette et al. . |
| 5,403,913 | 4/1995 | MacDiarmid et al. . |

OTHER PUBLICATIONS

"Polyaniline: Conformational Changes Induced in Solution by Variation of Solvent and Doping Level" by Jamshid K. Avlyanov et al., *Synthetic Metals*, vol. No. 72, 1995, pp. 65–71.

"Secondary Doping in Polyaniline" by Alan G. MacDiarmid and Arthur J. Epstein, *Synthetic Metals*, vol. No. 69, 1995, pp.85–92.

"Emulsion Polymerization of Aniline" by J. E. Österholm et al., *Synthetic Metals*, vol. No. 55–57, 1993, pp. 1034–1039.

"A Method to Prepare Soluble Polyaniline Salt Solutions—in situ Doping of PANI Base with Organic Dopants in Polar Solvents" by K. Tzou and R.V. Gregory, *Synthetic Metals*, vol. No. 53, 1993, pp. 365–377.

"Morphology of Conductive, Solutin–Processed Blends of Polyaniline and Poy(Methyl Methacrylate)" by C.Y. Yang et al., *Synthetic Metals*, vol. No. 53, (1993) pp. 293–301.

"Counter–Ion Induced Processibility of Conducting Polyaniline and of Conducting Polyblends of Polyaniline in Bulk Polymers" by Yong Cao et al., *Synthetic Metals*, vol. No. 48, 1992, pp. 91–97.

*Primary Examiner*—Duc Truong
*Attorney, Agent, or Firm*—Howell & Haferkamp, L.C.

[57] ABSTRACT

A method for increasing the conductivity of a composition of a polyaniline salt of an organic acid is disclosed. The method comprises contacting the composition with a polar organic solvent that is capable of solubilizing the organic acid without solubilizing the polyaniline salt. Also provided are coating compositions which can be prepared by the method.

12 Claims, 3 Drawing Sheets

METHOD OF INCREASING POLYANILINE CONDUCTIVITY

BACKGROUND OF THE INVENTION (1) Field of the Invention

The present invention relates to processible, electrically conductive polyaniline, and more particularly to methods for increasing the conductivity of polyaniline by contacting the polyaniline with a polar organic solvent, in particular an alcohol such as methanol and to processed forms of polyaniline with high conductivity.

(2) Description of the Prior Art

Polyaniline is recognized as being chemically stable and electrically conductive in the protonated or doped form. Nevertheless, use of polyaniline has been limited because it has been considered intractable or unprocessible. Recently, methods for preparation of conductive forms of polyaniline have been reported. These involve the production of the polyaniline salt by doping the polyaniline to the protonated, conducting form with acids as well as the synthesis of conducting polyaniline salts of protonic acids. (see, for example, Tzou and Gregory, Synth Met 53:365–77, 1993; Cao et al., Synth Met 48:91–97, 1993; Osterholm et al., Synth Met 55:1034–9, 1993). The protonic acid serves as a primary dopant providing the counter ion for the protonated emeraldine base form of the polyaniline. Some such protonic acid primary dopants are described as acting as surfactants in either the synthesis or doping after synthesis (Cao et al. Synth Met 48:91–97, 1992; Cao et al. U.S. Pat. No. 5,232,631, 1993).

In copending applications No. 08/335,143 and 08/596,202 which are incorporated herein by reference, a new emulsion-polymerization process was described for the production of a processible, conductive polyaniline salt which is soluble in carrier solvents such as xylene at a concentration greater than 25%. Although polyaniline salts made by this process can exhibit high conductivity and low resistance in compressed powder pellets, nevertheless, the resistance of films prepared from this material can still be high (see, for instance, examples 16 and 18 in copending application No. 08/335,143). It would thus be desirable to devise a method for increasing the conductivity of the polyaniline either during the processing or after it has been processed into any of a variety of useful shaped articles such as fibers, films and the like.

One method reported to increase the conductivity of polyaniline is by heat treating the doped polyaniline at temperatures of between 70° C. and 200° C. The resistance of coated fabric was reduced by about 50%, e.g. from 91 to 41 ohms per square with polyester fabric. After about two weeks, the resistance increased to values that were about the same or greater than those in fabric not receiving the heat treatment. In a modification of this procedure, the coating was treated with methanol after heating to produced a better stability of the coating, i.e. slower return of conductivity to original pretreatment values. The methanol treatment, however, produced an increase in resistance and, therefore, such methanol treatment as was disclosed in this reference did not provide a means for increasing conductivity of the coating.

Another approach that has been described for increasing conductivity of polyaniline has utilized a phenolic compound characterized as a secondary dopant (MacDiarmid et al., U.S. Pat. No. 5,403,913, 1995). By this method, a polyaniline doped with a protonic acid primary dopant is contacted with the phenolic compound and conductivity is reported to increase by a factor of up to about 500–1000 fold. The secondary dopant is thought to produce a conformational change in the polyaniline from a compact coil to an expanded coil form that persists after removal of the secondary dopant. (MacDiarmid and Epstein, Synth Met 69:85–92, 1995). In addition to increasing conductivity, the secondary dopant treatment caused a change from a chloroform-soluble to chloroform-insoluble polyaniline film; a swelling of the treated film that becomes more flexible upon evaporating the secondary dopant; a decrease in viscosity of the polyaniline in the phenolic doping solvent compared to that in chloroform; and a characteristic change in the U.V. absorption spectrum. (MacDiarmid et al., U.S. Pat. No. 5,403,913, 1995; Avlyanov et al., Synth Met 72:65–71, 1995; MacDiarmid and Epstein, Synth Met 69:85–92, 1995). Some of these changes might not be desirable. For example, the decrease in chloroform solubility is likely to decrease the processibility of the polyaniline if it is not already in its final form. Furthermore, the reported change in physical properties, i.e. swelling and change in flexibility might not be desirable in applications where a hard protective surface is desired. Moreover, the resultant increase in conductivity depends upon the particular combinations of primary and secondary dopants used such that some combination are relatively less effective in increasing conductivity (MacDiarmid and Epstein, Synth Met 69:85–92, 1995). Thus, there remains a continuing need for methods of preparing highly conductive forms of polyaniline salts of different protonic acid and for methods that allow for further processing of the polyaniline.

SUMMARY OF THE INVENTION

Briefly, therefore, the present invention is directed to a novel method for increasing the conductivity of a polyaniline composition comprised of a polyaniline salt of an organic acid. The process comprises contacting the polyaniline with a polar organic solvent. The polar organic solvent is a solvent in which the organic acid is soluble but the polyaniline salt is insoluble. Upon contacting the polyaniline composition with the polar organic solvent the conductivity of the polyaniline is increased by at least about ten fold.

The polyaniline composition useful in the present invention can be prepared by any method suitable for making a polyaniline salt of an organic acid suitable for formation into a continuous film, coating or fiber. One such method particularly applicable for preparing polyaniline for use in the present invention is comprised of an emulsion polymerization process as described in copending patent applications No. 08/335,143 and 08/596,202.

Thus, one embodiment of the process of this invention comprises contacting the polyaniline composition with a polar organic solvent. Preferred polar organic solvents include alcohols and a particularly preferred polar organic solvent is methanol. The polyaniline salt of an organic acid suitable for use in the present invention preferably has a molecular weight of at least about 4000 and a solubility in xylenes of at least about 5%, more preferably at least about 10%, still more preferably at least about 20% and most preferably at least about 25% prior to treatment with the polar organic solvent. Such high solubility in xylenes or other suitable carrier solvent facilitates the processing of the polyaniline.

The method of increasing conductivity is applicable to treating polyaniline that has been processed into useful forms or articles prior to treatment such as, for example, films, coatings, fibers and the like. Coatings can be applied to the surface a solid substrate material such as metal, glass or plastic for use in a variety of articles. In addition to being applicable to coatings on solid articles, the method of the present invention can be used to enhance the conductivity of coatings on textile materials such as fibers, filaments, yarns and fabrics. Such coatings of high conductivity on suitable substrates are applicable for a variety of uses in which high conductivity is desired such as in conductor or semiconductor components in batteries, photovoltaic devices, electrochromic devices and the like or conductive fabrics for use in antistatic garments, floor coverings, and the like.

Another embodiment provides for a composition comprising a polyaniline salt of an organic acid in which the polyaniline has been processed into a useful form and wherein the composition contains preferably no more than about 10% molar excess of organic acid to polyaniline salt monomers. The polyaniline salt composition preferably has a conductivity greater than about 0.01 S/cm, a molecular weight of at least about 4000 and a solubility in xylene prior to treatment of at least about 25%.

In another embodiment the composition comprises a blend of a polyaniline salt of an organic acid and a binder material which imparts adherence properties to the composition.

Among the several advantages found to be achieved by the present invention, therefore, may be noted the provision of a method for enhancing the conductivity of a polyaniline salt of an organic acid; the provision of a method for increasing the conductivity of a polyaniline composition that is highly processible; the provision of a method for increasing conductivity that can be utilized on polyaniline compositions after they have been processed into a variety of useful forms or objects; the provision of a highly processible form of polyaniline that also has high conductivity; and the provision of a polyaniline of an enhanced conductivity that has been processed into conductive fibers, films and the like.

DETAILED DESCRIPTION OF THE PREFERRED EMBODIMENTS

Figure 1A:
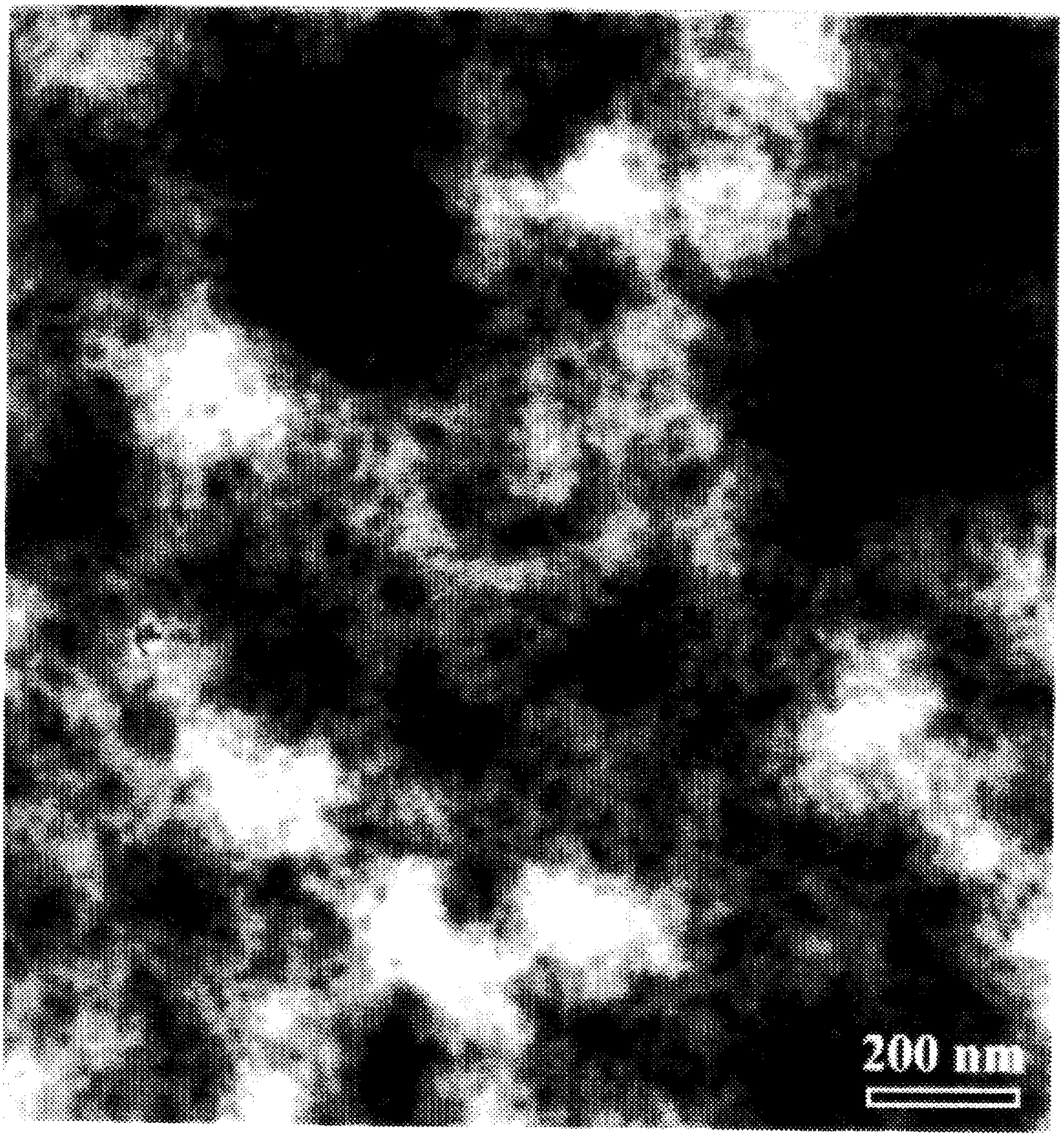
FIG. 1 illustrates the transmission electron micrographs of (a) a film prepared from polyaniline composition comprising the polyaniline salt of dinonylnaphthalenesulfonic acid and (b) a film prepared from the same polyaniline composition and treated by contacting the film with methanol for 2 minutes.

In accordance with the present invention, it has been discovered that the conductivity of a polyaniline composition can be increased by contacting the polyaniline with a polar organic solvent.

The polar organic solvent useful in the present invention is one in which the polyaniline composition is insoluble so that polyaniline is not extracted by treatment with the solvent. By insoluble it is meant that the polyaniline has a solubility in the polar organic solvent of less than about 1%. Thus, the polar organic solvent is preferably not a strong Br onsted acid or strong Brönsted base.

Furthermore, the polar organic solvent is a solvent in which the organic acid is soluble such that excess organic acid can be extracted from the polyaniline salt composition. Thus, the organic solvent suitable for use with a particular organic acid salt of polyaniline will depend upon which organic acid used and one skilled in the art can readily determine such solubility in selecting a particular solvent. Polar organic solvents useful in the present invention include but are not limited to alcohols, esters, ethers, ketones, anilines and mixtures thereof. Preferred polar organic solvents include the alcohols, methanol, ethanol, isopropanol and the like. Non polar solvents such as heptane are less effective in solubizing the excess organic acid present in the polyaniline salt composition.

Although not wishing to be bound by any mechanism of action, it is believed that the polar organic solvent serves to dissolve excess amounts of the organic acid as well as to produce a concentrating effect on the polyaniline salt. The organic acid material is believed to be non-conductive so that removal of excess organic acid increases conductivity. Furthermore, by removing such excess organic acid, it is believed that the conductive polyaniline then becomes denser which also tends to increase conductivity. Evidence of this removal of excess organic acid is in the observation that the organic acid is present in the treating solution after contacting the polyaniline and in the decrease in mass of the treated coating which corresponds to the amount of excess organic acid known to be present. In addition, transmission electron micrographs of a polyaniline film treated with the polar organic solvent show an increase in electron density. Moreover, a decreased solubility of the treated film in organic solvents such as methylene chloride, chloroform or benzene is also consistent with the conclusion that polyaniline becomes more dense upon treatment.

In the treatment of the polyaniline with the polar organic solvent to increase conductivity, it would be readily understood by one skilled in the art that the amount of increase in conductivity would depend both upon the solubility of the organic acid in the polar organic solvent and the time of contact with the solvent. Thus, for a polar organic solvent in which the organic acid is highly soluble, a relatively shorter time of contact will be required. On the other hand, for a polar organic solvent in which the organic acid is only somewhat soluble, a relatively longer time of contact will be required. One skilled in the art can readily determine the required contacting time for a particular polar organic solvent selected. The preferred solubility of the organic acid in the polar organic solvent is at least about 5%, at least about 10%, at least about 20%, at least about 30%, at least about 40% or greater. Although the ideal contact time can be readily determined by one skilled in the art, preferred contact times are at least about 1 second, at least about 2 seconds, at least about 30 seconds, at least about 1 minute, at least about 10 minutes, at least about 1 hour or more.

The polyaniline composition for use in this method can be in prepared or processed into any of a variety of useful forms including films, fibers and the like. Such useful polyaniline compositions are salts of organic acids which can be prepared by methods known in the art.

A particularly preferred polyaniline for use in the present invention is prepared by a polymerization process described in copending patent application Ser. Nos. 08/335,143 and 08/596,202 which are incorporated in their entirety by reference. In brief, the method comprises combining water, a water-solubilizing organic solvent, and organic acid that is soluble in said organic solvent, aniline and radical initiator. Organic acids that can be used in this polymerization process include but are not limited to organic sulfonic acids, organic phosphorus-containing acids, carboxylic acids, or mixtures thereof. Preferred organic sulfonic acids are dodecylbenzene sulfonic acid, dinonylnaphthalenesulfonic acid, dinonylnaphthalenesulfonic acid, p-toluene sulfonic acid, or mixtures thereof. Most preferred is dinonylnaphthalenesulfonic acid. The polyaniline produced by this process typically has a molecular weight as measured by number average, weight average or Z average, of at least 2000, more preferably at least about 4000 still more preferably at least about 10,000 and most preferably at least about 50,000 or 100,000 or greater.

Prior to application of the method in this invention, the polyaniline has been processed into a useful form which is possible as a result of its being highly soluble in any of a number of carrier solvents. In particular, the polyaniline is soluble in xylenes preferably to the extent of at least about 5%, more preferably at least about 10%, still more preferably at least about 20% and most preferably at least about 25% w/w which allows it to be processed into useful forms and articles such as for example films, fibers and the like. A preferred polyaniline composition is the polyaniline salt of dinonylnaphthalenesulfonic acid.

The processed polyaniline that has been treated according to the present has certain distinguishing characteristics. For example, excess organic acid has been removed from the processed form as a result of extraction with the polar organic solvent. As such, the polyaniline composition contains preferably less than about 20%, more preferably less than about 10% and most preferably less than about 5% of a molar excess organic acid to organic acid salt of polyaniline.

Polyaniline coatings or films can be treated by this method to enhance the conductivity of the film or coating on the surface of a solid substrate such as metal, glass, plastic or the like. The unprocessed polyaniline composition is comprised of a polyaniline salt of an organic acid dissolved in a suitable carrier solvent. This composition is applied to the substrate by any conventional method of application such as by spraying, by brush application, by dipping the solid substrate into a solution containing the polyaniline, by electrophoretic coating or the like. If application is from a solvent vehicle, the solvent can then be removed by air drying or by drying in an oven under reduced pressure. Air drying can include allowing the carrier liquid to evaporate or drying in a stream of air or nitrogen or other inert gas. Films and coatings thus prepared are continuous in that the polyaniline salt is substantially uniformly dispersed throughout the film. Furthermore, the films are substantially free of macromolecular particles. For example, polyaniline salt compositions prepared by the emulsion polymerization process are comprised of not more than 5% particles having a diameter greater than 0.2 microns. Such films show resistance values dependent upon the dimensions of the film. Films having a width 1.5 inches, a thickness of 0.015 cm, and 0.25 inches between measurement points for two-point resistance measurement typically show a resistance of between about 0.1 to about 10 megohms. The conductivity of such films range from about $10^{-4}$ to about $10^{-6}$ S/cm. The heating of the film can produce a small increase in conductivity of about 10 fold change compared to air drying of the film, however, the film still shows a low conductivity of less than about $10^{-5}$ S/cm. Even after heating to dry the film, however, conductivity remains low.

The coating compositions of the present inventions can also be comprised of a blend with a binder material. The binder material imparts suitable adherence properties to the polyaniline salt composition of the present invention so that it is capable of adherence to a solid surface or object. Any binder material capable of providing the necessary adherence properties to the blend and capable of being blended with the polyaniline salt composition can be used in connection with the present invention. Such binder materials convert to a dense, solid, adherent coating on a metal surface and preferably provide a non-thermoplastic matrix for the polyaniline salt blended therein, e.g. dissolved or dispersed in separate or continuous phases therein. The binder material may be an inorganic compound such as a silicate, a zirconate, or a titanate or an organic compound such as a polymeric resin. Exemplary organic resins include shellac, drying oils, tung oil, phenolic resins, alkyd resins, aminoplast resins, vinyl alkyds, epoxy alkyds, silicone alkyds, uralkyds, epoxy resins, coal tar epoxies, urethane resins, polyurethanes, unsaturated polyester resins, silicones, vinyl acetates, vinyl acrylics, acrylic resins, phenolics, epoxy phenolics, vinyl resins, polyimides, unsaturated olefin resins, fluorinated olefin resins, cross-linkable styrenic resins, cross-linkable polyamide resins, rubber precursor, elastomer precursor, ionomers, mixtures and derivatives thereof, and mixtures thereof with crosslinking agents. In a preferred embodiment of the present invention, the binder material is a cross-linkable binder (a thermoset), such as the epoxy resins, polyurethanes, unsaturated polyesters, silicones, phenolic and epoxy phenolic resins. Exemplary cross-linkable resins include aliphatic amine-cured epoxies, polyamide epoxy, polyamine adducts with epoxy, ketimine epoxy coatings, aromatic amine-cured epoxies, silicone modified epoxy resins, epoxy phenolic coatings, epoxy urethane coatings, coal tar epoxies, oil-modified polyurethanes, moisture cured polyurethanes, blocked urethanes, two component polyurethanes, aliphatic isocyanate curing polyurethanes, polyvinyl acetals and the like, ionomers, fluorinated olefin resins, mixtures of such resins, aqueous basic or acidic dispersions of such resins, or aqueous emulsions of such resins, and the like. Methods for preparing these polymers are known or the polymeric material is available commercially. Suitable binder materials are described in "Corrosion Prevention by Protective Coatings" by Charles G. Munger (National Association of Corrosion Engineers 1984 which is incorporated by reference). It should be understood that various modifications to the polymers can be made such as providing it in the form of a copolymer. The binder can be either aqueous based or solvent based.

The binder material can be prepared and subsequently blended with the polyaniline salt composition or it can be combined with the polyaniline salt composition and treated or reacted as necessary. When a cross-linkable binder is used, the binder may be heated, exposed to ultraviolet light, or treated with the cross-linking component subsequent to the addition of the polyaniline salt composition or concurrently therewith. In this manner it is possible to create a coating composition where the polyaniline salt composition is cross-linked with the cross-linkable binder.

Cross-linkable binders particularly suitable for this application include the two component cross-linkable polyurethane and epoxy systems as well as the polyvinylbutyral system that is cross-linked by the addition of phosphoric acid in butanol. Typical polyurethane coatings are made by reacting an isocyanate with hydroxyl-containing compounds such as water, mono- and diglycerides made by the alcoholysis of drying oils, polyesters, polyethers, epoxy resins and the like. Typical epoxy coatings are prepared by the reaction of an amine with an epoxide, e.g., the reaction of bisphenol A with epichlorohydrin to produce an epoxide that is then reacted with the amine. A novel blending method could, for example, involve polymerizing the polyaniline salt in a host polymer matrix such as polyvinylbutyral. When epoxies or polyurethanes are used as the host polymer matrix, a blend of polyaniline and the base polymer could be formulated and the cross-linking catalyst added just prior to the coating application. In an alternate embodiment, the polyaniline salt composition is blended with the cross-linking catalyst.

Such blends of a polyaniline salt composition and binder within the scope of the present invention are also referenced herein as continuous films or coatings as a result of the polyaniline salt being substantially uniformly dispersed throughout the film and, when prepared by the emulsion polymerization process, being comprised of not more than 5% of the polyaniline in the form of particles which have a diameter greater than 0.2 microns.

The conductivity of the films or coatings is enhanced upon treating, i.e. contacting the film or coating with the polar organic solvent. Such treatment or contacting can be by any conventional means such as, for example by dipping, spraying or the like. After treating the film, conductivity can be measured immediately or the film can be dried first either by air drying at room temperature or by drying in an oven, for example, at 80° C. and under about 25 inches of Hg. The treated and dried films show a substantial enhancement in conductivity compared to that prior to treatment. After treating the polyaniline film with the organic solvent, conductivity is increased, preferably, by a factor of about 10. More preferably, conductivity is increased by a factor of about 100, still more preferably by a factor of about 1000, even still more preferably by a factor of about 10,000 and most preferably by a factor of about 100,000 or greater. When using methanol as a polar organic solvent and contacting the film for about 60 seconds, the conductivity is increased to approximately 1–2 S/cm, i.e. an increase of from about 10,000 to about 100,000 from the pretreatment value.

The present method of increasing the conductivity of processed polyaniline is also useful where the polyaniline starting composition has been formed into a coating on to any of a wide variety of fibers or woven fabric materials including nylon cloth, polyester cloth as well as heavier fabric material such as is used in carpet backing which is typically a polyester. Typically such fabric materials have a resistance greater than about 1 GΩ (=$10^9$ Ω), i.e. conductivity is less than $10^{-9}$ Siemen ($10^{-9}$ $\Omega^{-1}$). Upon coating the material with the polyaniline, conductivity of the material is increased. Typically the polyaniline coating imparts a conductivity to the fiber or fabric material of less than about $10^{-5}$ S/cm. After treating the polyaniline coating with the organic solvent, conductivity is increased, preferably, by a factor of about 10. More preferably, conductivity is increased by a factor of about 100, still more preferably by a factor of about 1000, even still more preferably by a factor of about 10,000 and most preferably by a factor of about 100,000 or greater.

Any suitable method can be used for coating the fiber or fabric material. For example, the material can be dipped into a solution of the polyaniline salt or sprayed with the polyaniline solution in an appropriate carrier solvent and then dried. Such drying can be performed, for example, in an oven at 70° C. under reduced pressure of 20 mm Hg for about 10 minutes. Alternatively, the polyaniline coating can be air dried for a longer period such as overnight. After coating the fabric or material, treatment by contacting the fabric or material with the polar organic solvent causes an increase in the conductivity of the polyaniline coating.

The method of contacting the fabric or fabric material can be by any suitable method including dipping the coating in a solution of the polar organic solvent or spraying the fiber or fabric material with polar organic solvent. Upon drying, the treated coating shows a substantial increase in conductivity compared to the coating prior to treatment.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

EXAMPLE 1

This example illustrates the increase in conductivity produced upon contacting a film prepared the polyaniline salt of dinonylnaphthalenesulfonic acid with methanol.

The polyaniline salt of dinonylnaphthalenesulfonic acid was prepared by the process in copending applications Ser. No. 08/335,143 and 08/596,202 by overnight polymerization from a starting mixture of water, 2-butoxyethanol, dinonylnaphthalenesulfonic acid and aniline in an acid to aniline mole ratio of 1.66 to 1.0. The resultant green phase containing the polyaniline salt in 2-butoxyethanol was dissolved in xylenes as carrier solvent. Such solutions contain the polyaniline salt composition at a concentration of 45 to 55% by weight in xylenes and approximately 25–40 weight percent and butyl cellosolve at 5–30 weight percent.

The polyaniline salt composition was coated on to a substrate consisting of a 2.5 inch square mylar film onto which four gold strips of 0.25 inches in width and spaced apart by 0.25 inches were sputter deposited. The coating was prepared in a width of 1.5 inches and a thickness of approximately 0.006 inches or 6 mils using a draw bar method (see, for example, Allcock and Lampe, Contemporary Polymer Chemistry, 2nd Ed., Prentice Hall, Englewood Cliffs, N.J., 1990, pp. 501–2 which is incorporated by reference). The substrate and coated polyaniline film were then dried in a vacuum oven at 80° C. overnight under a vacuum of 27 inches Hg, with a slight nitrogen sweep (dynamic vacuum).

The thickness of the dried polyaniline film was calculated by multiplying the wet film thickness (0.006 inches) by the percent nonvolatile solids.

Resistance was measured using a Keithley Voltameter Model No. 2001 multimeter (Keithley Instruments, Inc. Cleveland, Ohio) by the two probe method. Briefly, this method involved measurement of the resistance between 3 sets of adjacent gold strips, and averaging the 3 values. The conductivity measurement of the polyaniline film was calculated in S/cm ($\Omega^{-1}$ $cm^{-1}$) as the distance between the electrodes (0.25 inches) divided by the product of the width of the film, the thickness of the film and the measured resistance.

The dried film on the substrate was divided in half into two sections, each having two electrodes in contact with the film. The film on one of the halves was then treated with methanol (100%) by immersing it into a beaker of methanol without stirring for 30 min. After removing from the methanol bath, the film was dried in a stream of air. The resistance measures was 11.9 Ω or a conductivity of 0.86 S/cm. The untreated half showed a resistance of 424 kΩ or a conductivity of $2.4\times10^{-5}$ S/cm. The increase in conductivity amounted to a 35,630 fold increase.

The treated coating had a flat finish compared to the normal shiny finish of the untreated half and the roughened nature of the surface was more evident under a microscope. In addition, the coating appeared to have shrunk with some curling evident on the coating side.

The treatment was repeated with newly prepared films using water or acetone. After treatment with water, the resistance was 129 kΩ or $6.7\times10^{-5}$ S/cm. Thus, water did not substantially change film conductivity. In contrast treatment with acetone produced an effect similar to that produced by methanol in that the resistance decreased to 25 ohms or 0.35 S/cm, which represents an increase in conductivity of 11,920 fold.

The effect of the length of time of contacting the polyaniline with the methanol was then tested by varying the times of contact of the film with methanol. One film was contacted with methanol for 2 min and resistance decreased from 323 kΩ to 4.8 Ω which represents an increase in conductivity of from $3.0\times10^{-5}$ to 2.0 S/cm (67,000 fold change). Another film was contacted for 5.4 sec and the resistance decreased from 352 k Ω to 3.4 Ω which represents an increase in conductivity of from $2.8\times10^{-5}$ to 2.8 S/cm (120,000 fold change). A third film was then repeatedly treated for very short contact times each followed by drying the film in a stream of nitrogen. In this film, the polyaniline film was contacted with methanol for a cumulative time of 1, 2, 3, and 4 sec and resistance decreased from 440 k Ω to 16.2, 6.2, 4.2 and 4.2 Ω respectively which represents an increase in conductivity of from $2.2\times10^{-5}$ S/cm to 0.60, 1.6, 2.3 and 2.3 S/cm, respectively. Thus, the maximal increase in conductivity takes place after approximately 1 to 3 seconds of contact with the methanol.

EXAMPLES 2–4

This example illustrates the increase in conductivity produced by treatment with methyl ethyl ketone, 2-propanol and ethanol.

A 3 mil wet film of polyaniline salt of dinonylnaphthalene sulfonic acid was drawn onto a sheet of polyester (PET) using a 4.25 inch wide draw down blade. The film was dried overnight at 80° C. under 27 inches of Hg vacuum. The film and substrate were then cut into strips approximately 0.75 inches by 2.0 inches. Resistances were measured by clamping the multimeter probes onto the coated surface. Results are shown in Table 1.

TABLE 1

| Example | Solvent | Before Treatment | 5 sec | 20 sec | Fold Increase at 20 sec |
|---|---|---|---|---|---|
| 2 | Methyl Ethyl Ketone | 26 MΩ | 12 kΩ | 1.2 kΩ | 21,666 |
| 3 | 2-propanol | 28 MΩ | 1 kΩ | 400Ω | 70,000 |
| 4 | Ethanol | 20 MΩ | 500Ω | 400Ω | 50,000 |

Thus, all three solvents substantially decreased resistance (i.e., conductivity). Furthermore, the increase in conductivity produced by methyl ethyl ketone appeared to take place slower than that of 2-propanol or ethanol which suggests that the organic acid, dinonylnaphthalene sulfate, is extracted more slowly by methyl ethyl ketone than by the other two solvents.

EXAMPLES 5–10

This example illustrates the increase in conductivity produced by different organic solvents.

Polyaniline films were prepared according to example 1 (except that the polyaniline salt had an acid to aniline ratio of 1.20 to 1.0 and that the drying vacuum period was reduced to 1 hour) and contacted with various organic solvents by immersion with minimal agitation for one minute followed by vacuum drying as above for 3 hours. The resistance was measured as above in example 1. Values obtained are shown in Table 2.

TABLE 2

| Example | Solvent | Resistance | Conductivity S/cm |
|---|---|---|---|
| 5 | aniline | 107Ω | 0.17 |
| 6 | Ethyl Acetate | 169Ω | 0.11 |
| 7 | Diethyleneglycol dimethylether | 652Ω | $2.8 \times 10^{-2}$ |
| 8 | methanol/heptane (20/80) | 685Ω | $2.7 \times 10^{-2}$ |
| 9 | heptane | 181 kΩ | $1.0 \times 10^{-4}$ |
| 10 | 2-butoxyethanol | 618 kΩ | $3.0 \times 10^{-5}$ |

As shown in the table several different types of polar organic solvents are effective in decreasing film resistance.

EXAMPLE 11

This example illustrates the effect of treating a polyaniline film with a mixture of methanol and water in varying amounts.

Polyaniline films were prepared according to the method of examples 5–10. Mixtures of water and methanol were then used to treat the film for a contact time of one minute. After of an additional 3 hr drying at 80° C. under 27 inches Hg vacuum, conductivity was again measured according to the method in examples 5–10. The shown in Table 3.

TABLE 3

| Solvent Mix (% MeOH) | Resistance (Ohms) | Conductivity (S/cm) |
|---|---|---|
| 0% | 449 kΩ | $4.3 \times 10^{-5}$ |
| 20 | 502 kΩ | $3.8 \times 10^{-5}$ |
| 40 | 74.2 kΩ | $2.6 \times 10^{-4}$ |
| 60 | 37.1 kΩ | $5.1 \times 10^{-4}$ |
| 80 | 29.9 kΩ | $6.5 \times 10^{-4}$ |
| 100 | 20.7Ω | 0.89 |

At 0 and 20% methanol, conductivity was low and at values comparable to untreated films (see example 1). At 40, 60 and 80% methanol decreases in resistance and increases in conductivity were seen. At 100% methanol, a substantially lower value for resistance was observed compared to much higher values with all of the mixtures of methanol with water.

EXAMPLE 12

This example illustrates the insolubility of the methanol-treated polyaniline films in methylene chloride.

Polyaniline films were prepared according to the method in example 1 and then exposed to methanol for 2 minutes. Resistance was 1.03 MΩ and conductivity was $2.0\times10^{-5}$ S/cm prior to treatment with methanol and 5.1 Ω or 4.0 S/cm following treatment with methanol. After treating with methanol, the film was immersed in methylene chloride for 24 hours. The methylene chloride bathing solution remained clear and colorless indicating that the polyaniline film did not dissolve in the methylene chloride. By way of comparison, a polyaniline film not treated with methanol appeared to be substantially dissolved (i.e. greater than about 90% dissolved) after soaking in the methylene chloride bath for 24 hours becoming dark green in color due to the presence of the emeraldine salt in the solvent composition.

EXAMPLE 13

This example illustrates the treatment with ethanol vapor to increase the conductivity of a polyaniline film and the reversibility of the effect.

A film of the polyaniline salt of dinonylnaphthalenesulfonic acid with an acid to aniline ratio of 1.20 to 1.0 was prepared on a mylar film with gold strips according to the method in example 1 and dried for one hour at 80° C. under a vacuum of approximately 25 inches Hg with a nitrogen sweep. The resistance was measured and the conductivity calculated as in example 1.

The film and substrate were then placed in a large beaker containing a pool of liquid methanol at room temperature (approximately 25° C.) and positioned on a smaller beaker which served to support the film and substrate above the methanol liquid. The large beaker was then covered with a watch glass cover.

The film and substrate were removed from the large beaker periodically over a period of 2 hours and the resistance and conductivity of the film determined.

The film and substrate were then removed from the large beaker and vacuum dried at 80° C. and 25 inches Hg under nitrogen. Resistance and conductivity were determined after 1 hour of drying and after an extended period of drying (either 14 or 19 hours). Changes in the mass of the film were monitored in one experiment only.

Results are shown in Table 4.

TABLE 4

| | Film A | Film B | |
|---|---|---|---|
| | Conductivity (S/cm) | Mass (grams) | Conductivity (S/cm) |
| Before Treatment | $2.9 \times 10^{-6}$ | 0.0781 | $3.8 \times 10^{-6}$ |
| MEOH vapor | | | |
| 17 min. | $7.4 \times 10^{-3}$ | 0.0793 | 1.6 |
| 30 min. | $9.2 \times 10^{-2}$ | 0.1017 | 1.7 |
| 1 hr. | .049 | 0.1077 | 2.0 |
| 2 hr. | 0.61 | 0.1110 | 2.3 |
| Drying | | | |
| 1 hr. | $3.6 \times 10^{-6}$ | 0.0748 | $6.5 \times 10^{-4}$ |
| Extended Drying | $2.8 \times 10^{-5}$a | 0.0848b | $4.9 \times 10^{-4}$b |

a 14 hr. drying at 80° C. and 25 inches Hg under $N_2$.
b 9 hr. drying at 80° C. and 25 inches Hg under $N_2$.

As seen in Table 4 film conductivity increased substantially upon exposure of the film to methanol vapors for a period of from 17 minutes to 2 hours. The film mass increased upon exposure to the methanol vapors indicating that the methanol was condensing on or within the film. Furthermore, upon removal of the film and substrate from the methanol vapor, resistance increased and conductivity decreased to approach pretreatment values.

The solubility of the films treated with methanol vapor was determined as in example 12 by immersing film B with substrate into a methylene chloride bath. In contrast to the lack of solubility in methylene chloride for films treated with methanol liquid in example 12, films treated with methanol vapor were soluble in methylene chloride as were untreated films.

EXAMPLE 14

This example illustrates the preparation of a formulation of the polyaniline salt of dinonylnaphthalenesulfonic acid, Duro-tak® 1057 adhesive, and 2-propanol.

A solvent-based acrylic adhesive sold under the trade name Duro-tak® 1057 (National Starch Co., Bridgewater, N.J.) (1.569 grams), was added to 2-propanol (0.507 grams) and the mixture stirred with a spatula. 0.485 grams of the polyaniline salt of dinonylnaphthalenesulfonic acid in xylenes as carrier solvent at a concentration of 54% solids was added to the mixture followed by stirring. A film of approximately 6 mil thickness was prepared according to the method in example 1 and the film was dried in a vacuum oven at 80° C. and 25 inches vacuum for approximately three hours. Resistance calculated as the mean of three values measured between the gold electrodes was 94 kΩ. In contrast to this, films comprised of 100% polyaniline salt of dinonylnaphthalenesulfonic acid showed a mean resistance of 543 kΩ. Thus, the formulated adhesive coating shows better conductivity than untreated polyaniline coatings indicating that the 2-propanol is capable of increasing conductivity and decreasing resistance while the polyaniline is still in the processed state such that final articles or forms produced after processing still retain the increased conductivity produced by the polar organic solvent.

EXAMPLE 15

This example illustrates the effect m-cresol on the conductivity of a polyaniline film.

A film of the polyaniline salt of dinonlynaphthalenesulfonic acid was prepared as in example 1. Film resistance was 203 kΩ and conductivity was $4.5\times10^{-5}$ S/cm. The film was dipped in m-cresol and rinsed in n-heptane and allowed to dry by evaporation of the air. The film appeared to swell upon treatment. Neither the m-cresol nor the n-heptane showed any color suggesting that no polyaniline was extracted by the treatment.

The treated film was dried on a hot plate at 100° C. Film resistance was 3.15 kΩ or $2.9\times10^{-3}$ S/cm. After further drying at 110° C. for 1.5 hours, the films resistance was 3.82 kΩ or $2.4\times10^{-3}$ S/cm. Thus, m-cresol decreased resistance and increased conductivity of the film, however, the effect was substantially less than that after methanol treatment.

EXAMPLES 16–19

This example illustrates the relative lack of effect of heating on the conductivity of polyaniline films compared to the effect of methanol treatment.

Films of the polyaniline salt of dinonlynaphthalenesulfonic acid with an acid to aniline ratio of 1.20 to 1.0 and having a thickness of 6 mils, were prepared as in example 1. The effect of heating on the films immediately after preparation and after treating with methanol was determined. After preparation of the films, film resistances were measured (Wet Film resistance in Table 5) and the films dried under a vacuum of 25 inches of Hg with a small nitrogen sweep for 1 hour either at room temperature or at 80° C. Films were then treated by dipping in methanol for 60 seconds followed by air drying with a blower for approximately one minute. The films were then dried for three hours in a vacuum oven under 25 inches of Hg either at room temperature or at 80° C. Table 5 shows the resistance and conductance values following each treatment.

TABLE 5

| Treatment | Example 16 | 17 | 18 | 19 |
|---|---|---|---|---|
| Wet Film | Not measured | 12.5 MΩ (1.5 × 10$^{-6}$ S/cm) | Not measured | 32.8 MΩ (5.8 × 10$^{7}$ S/cm) |
| Vacuum Dry 1 hr/no heat | 40 MΩ (4.9E−7 S/cm) | 34 MΩ (5.7E−7 S/cm) | N/A | N/A |
| Vacuum Dry 1 hr/80° C. | N/A | N/A | 4.48 MΩ (4.2E−6 S/cm) | 2.54 MΩ (7.5E−6 S/cm) |
| Methanol Treat, Blow Dry | Not measured | Not measured | 4.55Ω (4.2 S/cm) | 4.17Ω (4.5 S/cm) |
| Vacuum Dry 3 hr/no heat | 165Ω (0.12 S/cm) | 232Ω (0.084 S/cm) | N/A | N/A |
| Vacuum Dry 3 hr/80° C. | N/A | N/A | 14.9Ω (1.3 S/cm) | 19.8Ω (0.96 S/cm) |

As shown in the table, films dried either at room temperature or at 80° C. have a high resistance and low conductivity. In the heat treated samples, a resistance decreased by approximately 10 fold and conductivity increased correspondingly (example 20). After treatment with methanol, resistance decreased and conductivity increased by approximately 6 orders of magnitude. Following methanol treatment, 3 hours of drying at either room temperature or at 80° C. resulted in a relatively small increase in resistance or decrease in conductivity.

Thus, the application of heat to the films either prior to or after treating the films with methanol produced only relatively small changes in resistance and conductivity compared to the change produced by contacting the film with methanol.

EXAMPLE 20

This example illustrates the extraction of dinonylnaphthalenesulfonic acid from films prepared from the polyaniline salt of the same acid upon dipping the film in a methanol bathing solution to enhance conductivity.

A 6 mil thick film (wet) of the polyaniline salt of dinonlynaphthalenesulfonic acid was prepared as in example 1.

The mass of the coating was determined to be 0.089 grams by weighing the substrate before and the substrate and film after applying the film. Film resistance was 0.467MΩ and conductivity was 2.2×10$^{-5}$ S/cm.

After treatment for 2 min by dipping the substrate and film in 20.00 grams of methanol, the film was air dried with a nitrogen jet for about one minute. Resistance was determined to be 3.18 Ω and conductivity was 3.2 S/cm (147,000 fold increase). Film mass after treatment was determined to be 0.029 grams by comparing the weight of the treated film and substrate and to the value for the substrate alone.

Assuming all of the observed 60 mg decrease in film mass was dinonylnaphthalenesulfonic acid which became dissolved in the 20 ml of methanol, this would represent a concentration of 0.291% or 2910 ppm of dinonylnaphthalenesulfonic acid in methanol. HPLC analysis of the methanol solution gave a peak indicating the presence of dinonylnaphthalenesulfonic acid at a concentration of 2900 ppm. This suggests that the change in conductivity produced by contacting the polyaniline salt of dinonylnaphthalenesulfonic acid with methanol results from extraction of the acid from the composition.

The change in film mass was 67% ((89mg−29mg)/29mg). Calculation of the percent of excess of dinonylnaphthalenesulfonic acid in the polyaniline salt starting composition which had a 1.66:1 ratio of acid to aniline gives a value of 62.3% excess acid by weight. The agreement between the weight of excess acid present in the film composition and the loss of weight upon treatment with methanol suggests that the weight loss could be the acid that is in stoichiometric excess. This taken with the measurement of an amount of dinonylnaphthalenesulfonic acid in the extracted solution comparable to that predicted from the decrease in weight indicates that methanol acts to extract excess acid from the film. Such an action of methanol could account for the increase in conductivity inasmuch as removal of excess acid which is believed to be non-conductive would have the effect of concentrating the remaining conductive polyaniline salt.

EXAMPLE 21

This example illustrates the transmission electron micrography of a film prepared from the polyaniline salt of dinonylnaphthalenesulfonic acid and treated with methanol.

The polyaniline salt of dinonyhlnaphthalenesulfonic acid was prepared as described in Example 1 and dissolved in xylenes at a concentration of 5%. Electron beam transparent thin films were prepared by dipping a gold grid into the solution. Thin films of the polyaniline salt were obtained by drying the grid in air for approximately 10 minutes. The thin films were directly examined in the electron microscope.

Transmission electron microscopy (TEM) was carried out using a JEOL 200FX instrument with an image resolution of 0.3 nm. The microscope was operated at 200 kV. The vacuum in the specimen chamber area was approximately 10$^{-5}$ Pa. Digital TEM images were obtained using a Charge-Coupled Device camera (Gatan Inc.).

After initial TEM images were recorded, the samples were removed from the microscope and treated by contacting the film with methanol for 2 minutes.

Figure 1B:
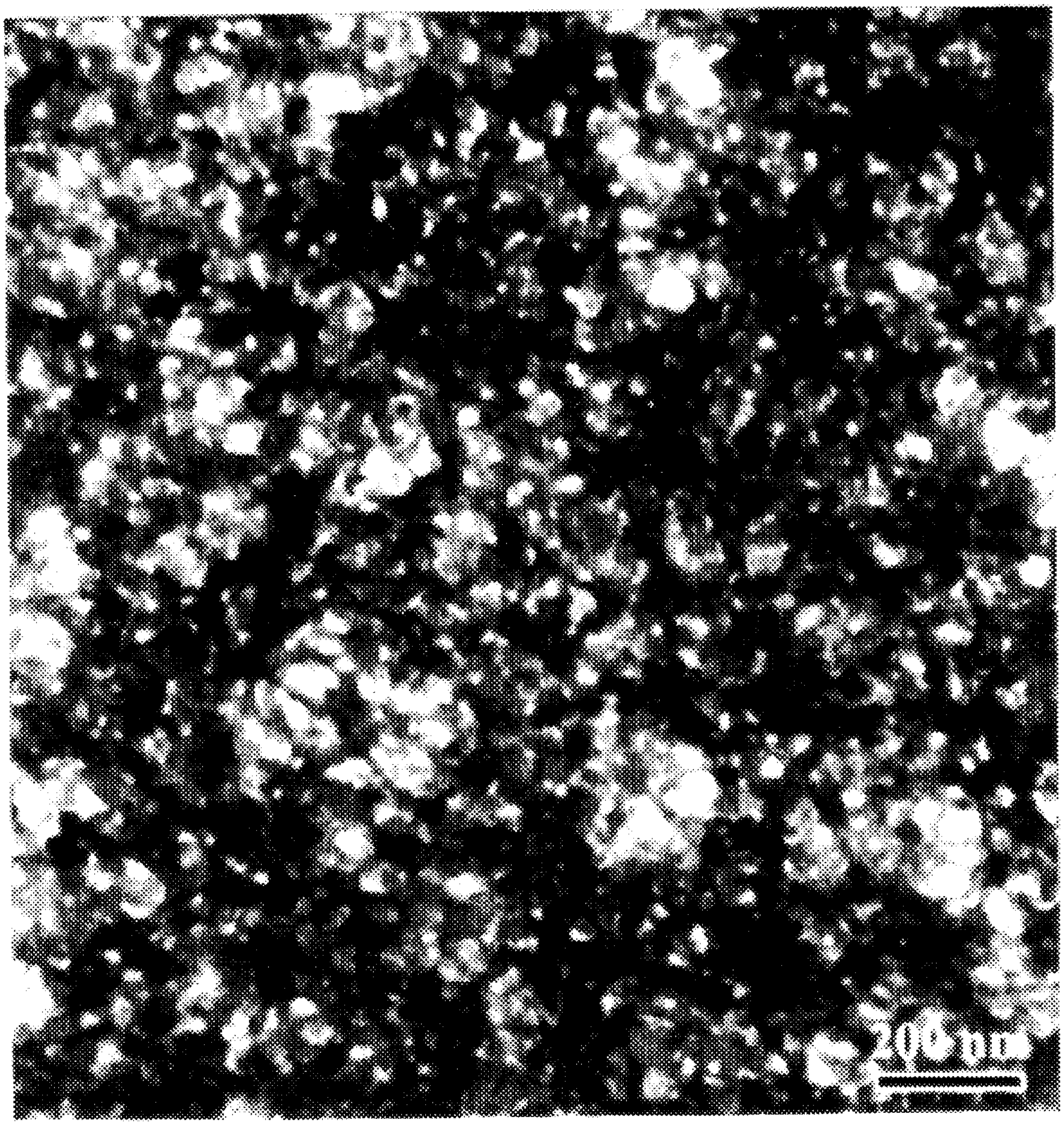

The bright field TEM of the untreated film showed dark spots or domains representing the polyaniline which is thought to be conductive and bright domains representing the dopant phase which is thought to be non-conductive (FIG. 1*a*). Small islands of polyaniline were embedded in the dopant matrix which appeared to be amorphous. Some of these small islands are aggregated to form domains which are believed to be conductive domains. After treatment with methanol the dark domains containing the polyaniline salt became darker and denser while the brighter domains appear to have been converted into voids (FIG. 1*b*).

EXAMPLE 22

This example illustrates the UV spectrum of a film prepared from the polyaniline salt of dinonylnaphthalenesulfonic acid and treated with methanol.

Films of the polyaniline salt of dinonylnaphthalenesulfonic acid were prepared on a mylar substrate as described in Examples 1–4 by spin coating at a spinning speed of 2000 rpm. The UV spectroscopy was then performed on films without and with treatment with methanol. UV spectra were obtained using a Cary 5 UV-Vis-Near IR spectrometer over a spectral range of from 300 nm to 3300 nm.

Figure 2:
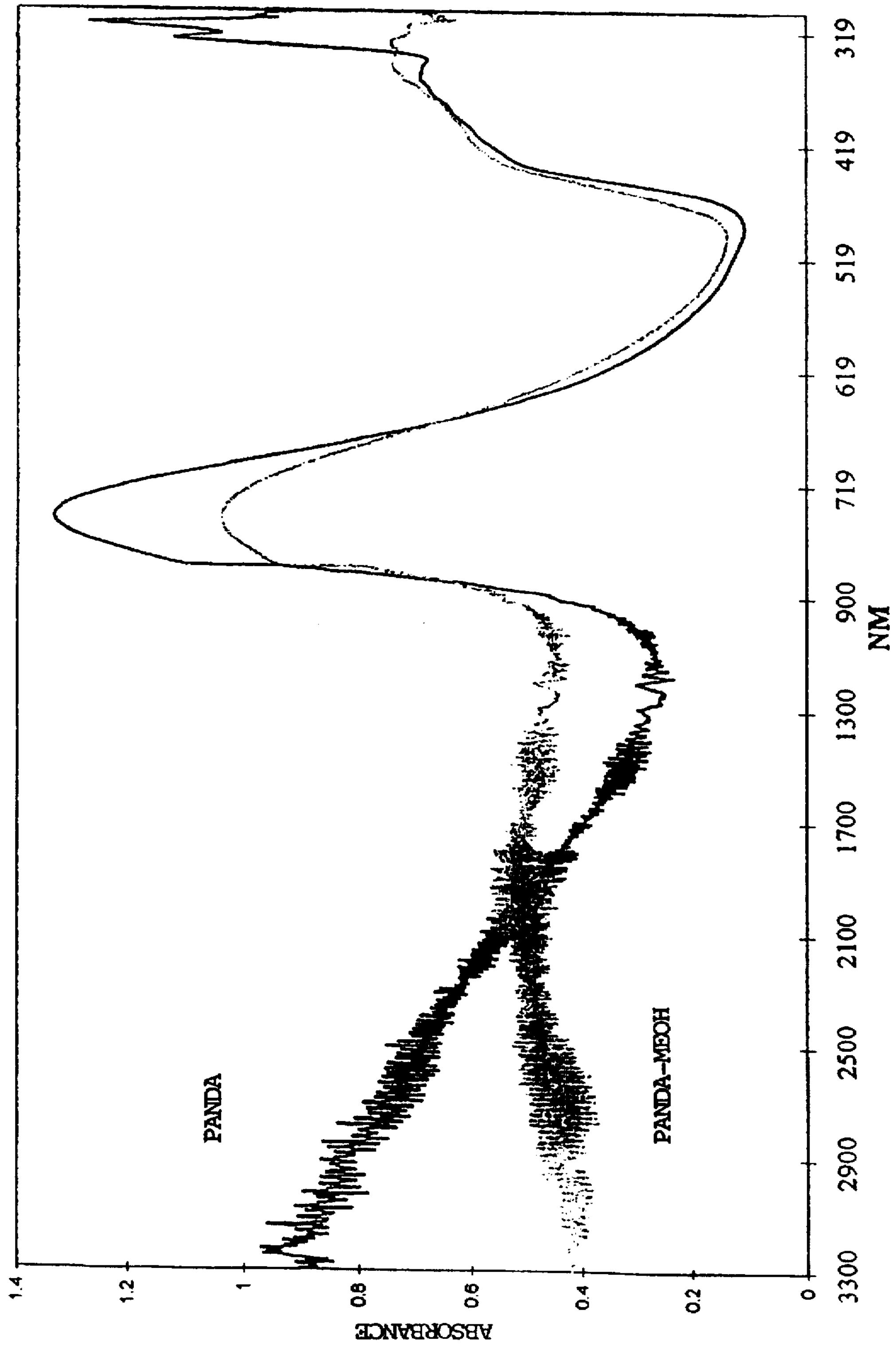
FIG. 2 illustrates the UV spectra of a film prepared from a polyaniline composition comprising the polyaniline salt of dinonylnaphthalenesulfonic acid (PANDA) and a film prepared from the same polyaniline composition and treated by contacting the film with methanol (PANDA-MEOH).

As shown in FIG. 2, both the untreated and treated films showed absorption at approximately 450 nm, a prominent absorption peak at approximately 800 nm and a tailing commencing at approximately 1300 nm and steadily increasing to about 3200 nm. The spectrum in the treated film was nearly identical to that of the untreated film with the exception that the peak at approximately 800 nm was diminished and no tailing was seen between 1300 nm and 3200 nm.

In view of the above, it will be seen that the several advantages of the invention are achieved and other advantageous results attained.

As various changes could be made in the above methods and compositions without departing from the scope of the invention, it is intended that all matter contained in the above description and shown in the accompanying drawings shall be interpreted as illustrative and not in a limiting sense.

What is claimed is:

1. A method for increasing the conductivity of a composition containing an organic acid salt of polyaniline comprising processing the composition into a useful form while maintaining the organic acid salt of polyaniline in contact with an excess of the organic acid; and contacting the useful form with a polar organic solvent in which the organic acid is soluble, whereupon the conductivity of the composition is increased by a factor of at least about 10.

2. A method according to claim 1 wherein the organic acid is a sulfonic acid, a phosphorus-containing acid, a carboxylic acid, or mixtures thereof.

3. A method according to claim 2 wherein the organic acid is an organic sulfonic acid.

4. A method according to claim 3 wherein the organic acid is dinonylnaphthalenesulfonic acid.

5. A method according to claim 1 wherein the polar organic solvent is an alcohol, an ester, an ether, a ketone, an aniline or mixtures thereof.

6. A method according to claim 5 wherein the polar organic solvent is an alcohol.

7. A method according to claim 6 wherein the polar organic solvent is methanol.

8. A method according to claim 1 wherein the organic acid salt of polyaniline has a solubility in the polar organic solvent of less than about 10%.

9. A method according to claim 1 wherein the organic acid has a solubility in the polar organic solvent of at least about 10%.

10. A method according to claim 1 wherein prior to the contacting said polyaniline has a solubility in xylenes of at least about 25%.

11. A method according to claim 1 wherein after contacting said polyaniline has a solubility in methylene chloride of less than about 1%.

12. A method as set forth in claim 1, wherein the useful form comprises a film, coating, fiber, filament, yarn, or fabric.

* * * * *